United States Patent [19]

Wharton

[11] Patent Number: 4,744,588
[45] Date of Patent: May 17, 1988

[54] SUSPENSION SYSTEM
[75] Inventor: Charles E. Wharton, Lake Bluff, Ill.
[73] Assignee: TLW, Inc., Lake Bluff, Ill.
[21] Appl. No.: 4,031
[22] Filed: Jan. 16, 1987

Related U.S. Application Data

[63] Continuation-in-part of Ser. No. 836,056, Mar. 4, 1986.
[51] Int. Cl.$^4$ ............................................. B60G 11/20
[52] U.S. Cl. ...................... 280/700; 267/273; 280/721
[58] Field of Search ............... 280/700, 703, 705, 170, 280/43.18, 721; 188/130, 57; 267/5 R, 9 R, 57

[56] References Cited

U.S. PATENT DOCUMENTS 2,163,131  6/1939  Porsche ................................. 267/57
2,779,602  1/1957  Kimbro et al. ..................... 280/43.18
3,330,558  7/1967  Simons, Jr. ........................... 267/57
3,844,583  10/1974  Sakow et al. ........................ 280/721
4,580,808  4/1986  Smith-Williams ................... 280/700

Primary Examiner—Richard A. Bertsch
Attorney, Agent, or Firm—Garrettson Ellis

[57] ABSTRACT

A suspension system comprises a first hub, bearing means spaced from the hub, a second hub carried within the bearing means and rotatable relative to it, and torsion bar means carried by the first and second hubs and extending between them. At least the second hub is positioned within a stationary, hollow tube of non-circular cross section, with the second hub defining rotary motion limiter means that moves into contact with the hollow tube at a desired limit of rotary motion of the second hub, to prevent further rotary motion beyond the limit. The second hub also carries a transversely extending arm. The second hub, including the limiter means and the arm, is made of a single, cast piece for improved manufacturing efficiency.

9 Claims, 1 Drawing Sheet

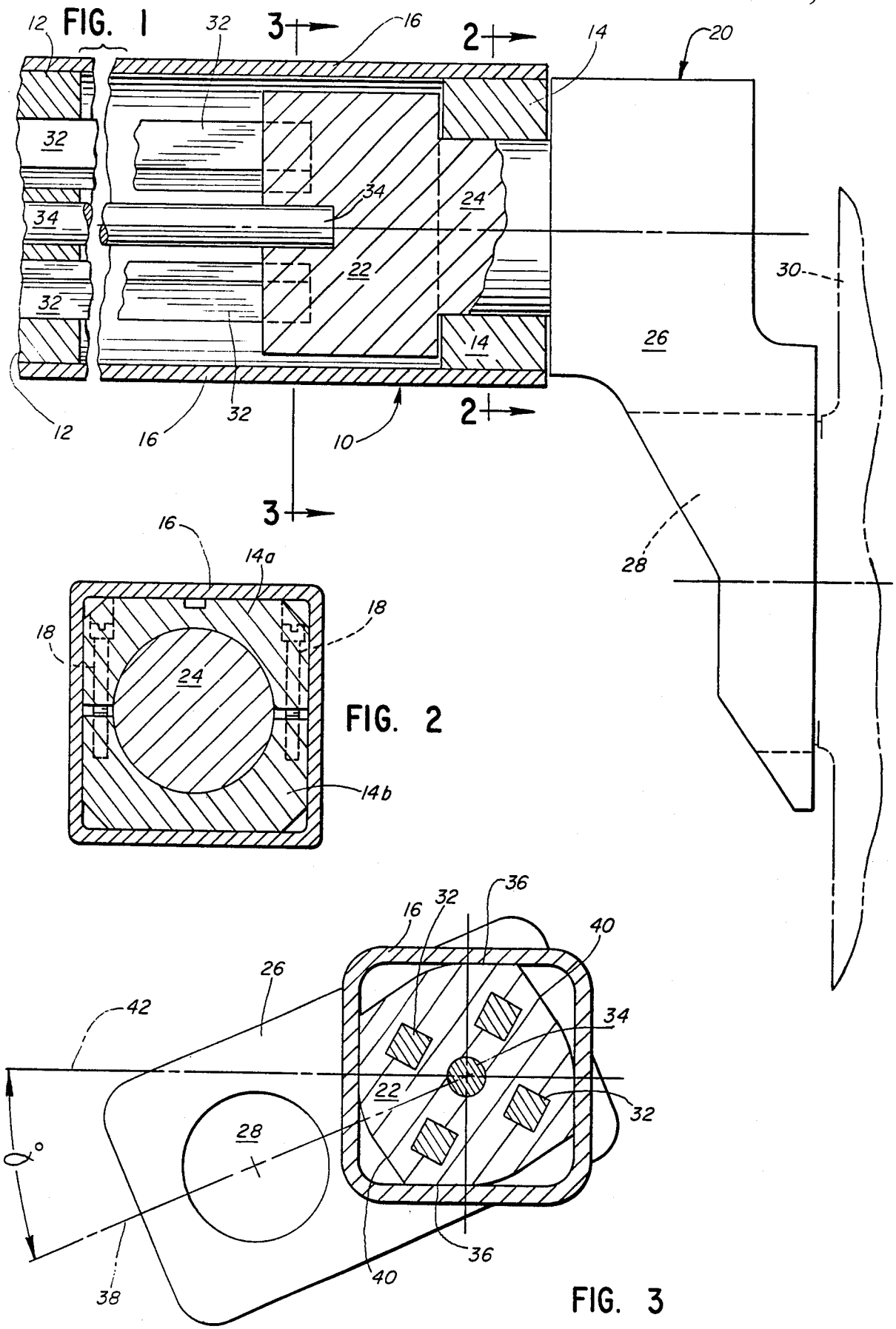

4,744,588

SUSPENSION SYSTEM

CROSS REFERENCE TO RELATED APPLICATION

This application is a continuation-in-part of allowed U.S. application Ser. No. 836,056, filed Mar. 4, 1986 and entitled Torsion Spring Cartridge.

BACKGROUND OF THE INVENTION

In International Patent Application No. PCT/US 84/00226 (International Publication No. WO 85/03750) a torsion spring cartridge assembly is disclosed which may be used for supporting wheels on trailers or other vehicles, and has significant advantages over its prior art. A corresponding U.S. application of the same title exists: U.S. application Ser. No. 781,149, filed Aug. 14, 1985.

As one disadvantage of the structure disclosed in the International Application, it is relatively expensive to manufacture. Additionally, if subjected to excessive loads or bumps, the torsion spring cartridge assembly of the International Application can rotate beyond its mechanical limits, causing breakage of the torsion rod system used therein.

There is need for a suspension system for vehicles or any other desired use in which the system is protected against damage by overload. Also, there is a need to increase the manufacturing efficiency and to reduce the expense of the desired suspension system so that the system is not only less likely to break on overload, but is of reduced cost.

Additionally, large objects may have the suspension system of this invention installed under them for the temporary addition of wheels. Then, they may be rolled to a desired location, and the suspension systems may be removed and used elsewhere.

Additionally, the amount of torsion can be adjusted by varying the number of torsion bars used in the system, so that the same torsion bar suspension unit may be easily modified by simply adding or subtracting torsion bars as may be desired. Furthermore, upon axle failure following abuse of the system, torsion bar systems in accordance with this invention have much less tendency to cause loss of control.

DESCRIPTION OF THE INVENTION

In accordance with this invention, a suspension system is provided which comprises a first hub, bearing means spaced from the hub, and a second hub carried within the bearing means and rotatable relative to it. Torsion bar means are also provided, carried by the first and second hubs and extending between them. At least the second hub is positioned within a stationary, hollow tube of non-circular cross section, for example square cross section.

The second hub defines rotary motion limiter means that moves into contact with the hollow tube at a desired limit of rotary motion of the second hub, to prevent further rotary motion of the second hub beyond said limit. Additionally, the second hub also carries a transversely extending arm, the second hub, including the limiter means and said arm, being made of a single, cast piece.

The bearing means is preferably a split bearing, retained together by bolts, clamps, or the like at either side, being typically a pair of generally semicircular bearing halves which are secured together about a portion of the second hub. Typically, the bearing means are positioned within the hollow tube and secured thereto in immoveable manner.

The torsion bar means typically comprises a plurality of separate torsion bars, although a single torsion bar may be used if desired. It is preferred to arrange the plural torsion bars eccentrically relative to the first and second hubs. Typically, the torsion bars are distributed about the axis of the two, coaxially aligned hubs in a generally uniform manner.

The suspension system of this invention may include an alignment rod which typically extends between the first and second hubs in coaxial relation therewith, being generally surrounded by the plurality of torsion bars.

The transversely extending arm may carry a wheel at a position which is spaced from the junction of the arm and the second hub. However, the suspension system may be used for a large variety of other purposes above and beyond the holding of a wheel on a vehicle. For example, it may be used with tracked vehicles, or for non-vehicular purposes in machinery, or anywhere else where resilient, rotary suspension may be desired.

The rotary motion limiter means may constitute a portion of a second hub which is proportioned to be spaced from the noncircular housing in permitted rotational positions of the second hub, but which is proportioned to engage the housing to prevent further rotation of the second hub in a least one rotational position, to prevent rotation to other, nonpermitted rotational positions.

DESCRIPTION OF THE DRAWINGS

In the drawings, FIG. 1 is a partial elevational view, taken partly in section and with a portion broken away, of a suspension system in accordance with this invention.

FIG. 2 is a sectional view taken along line 2—2 of FIG. 1, showing only that portion of the suspension system in the plane of the section.

FIG. 3 is a sectional view taken along line 3—3 of FIG. 1, of somewhat reduced size, showing background parts of the suspension system as well.

DESCRIPTION OF SPECIFIC EMBODIMENT

Referring to the drawings, a suspension system is shown which may be similar in function and construction to the torsion spring cartridge of the previously cited U.S. patent application Ser. No. 836,056, except as otherwise disclosed herein.

Suspension system 10 comprises a first hub 12, and bearing means 14 spaced from first hub 12. Bearing means 14 is secured in conventional manner to the inside of noncircular steel tube 16, which in this embodiment is of rectangular cross section as shown in FIGS. 2 and 3. Bearing 14 comprises a pair of split halves 14a, 14b, which are secured together in conventional manner by bolts 18 or the like.

Second hub 20 may be made of a single piece of cast iron or the like, being of the particular shape as shown. Second hub 20 includes a hub and motion limiter portion 22, a bearing rotor portion 24, which rotates within bearing 14, and an arm portion 26 which may have an aperture 28 for carrying a wheel 30. Alternatively, arm 26 may be attached to a functional part of a machine, or used for any purpose where rotational suspension is desired.

First and second hubs 12, 20, respectively connect with a plurality of torsion bars 32, which are shown to be distributed about the common axis of hubs 12, 20. However, torsion bars 32 are not limited to a rectangular cross sectional shape, or any particular shape, but may also be of the designs as described in the previously pending U.S. application Ser. No. 836,056.

Additionally, an optional alignment rod 34 may be provided in coaxial relation with hubs 12 and 20. Each of the ends of torsion bars 32 and alignment rod 34 may be retained at their ends within corresponding apertures defined in the respective hubs 12, 22.

Accordingly, it may be seen that as wheel 30, or whatever engages arm 26, encounters shock force, arm 26 will rotate. This, in turn, causes second hub 20 to rotate within bearing 14, which causes torsion bars 32 to be twisted, since first hub 12 is mounted, typically within tube 16, in stationary manner. Thus the shock of force on arm 26 is absorbed and damped, with the suspension system springing back into position as the force is dissipated.

In accordance with this invention, the one-piece, second hub 20 carries rotary motion limiter means, which means are defined by the periphery of section 22. As specifically shown in FIG. 3, flat sides 36 of the periphery of section 22 are shown to be in engagement with the inner surface of tube 16 when arm 26 is at one rotational extreme of the permitted range or rotation, as illustrated by rotation center line 38. As arm 26 rotates upwardly from the viewpoint of FIG. 3, it rotates about the angle shown until flat sides 40 of the periphery of section 22 enter into engagement with the inner surface of tube 16, as the axis of arm 26 moves to occupy the position of limit line 42. It can thus be seen that the desired range of rotation of arm 26 may be adjusted by appropriate adjustment of the positions and angles of flat sides 36,40, to provide any desired limits of rotation to suspension system 10 to protect torsion bars 32 from damage caused by overrotation.

For manufacture of the apparatus of this invention, it can be seen to be easily done, making use of the single, cast second hub 20 which includes portions 22, 24, and 26. Separate bearing portions 14a, 14b may be clamped about section 24 of hub 20, and the assembly inserted into tube 16 of non circular cross section as shown. Torsion bars 32 and rod 34 may also be inserted, as first hub 12 receives the other ends of bars 32 and rod 34. First hub 12 is also preferably inserted into tube 16. Then, hub 12 and bearing 14 may be bolted or otherwise secured into locked, immoveable relation with tube 16. Tube 16 may then be mounted into a bracket on a vehicle or trailer, or wherever else desired, to provide a removeable suspension system. A wheel 30 or other device may be mounted upon arm 26, resulting in a suspension system of great ease of manufacture and installation. Likewise, the system is easily removeable by simply detaching tube 16 from its bracket for repair or replacement, or simply for removal when its job is done.

The above has been offered for illustrative purposes only, and is not intended to limit the scope of the invention of this application, which is as defined in the claims below.

That which is claimed is:

1. In a suspension system which comprises a first hub, bearing means spaced from said hub, a second hub carried within said bearing means and rotatable relative to it, and a plurality of separate torsion bars positioned eccentrically relative to said first and second hubs, at least a portion of said second hub and said bearing means being positioned within a stationary, hollow tube of noncircular cross section, said second hub defining rotary motion limiter means that moves into contact with said hollow tube at a desired limit of rotary motion of the second hub, to prevent further rotary motion beyond said limit, said rotary motion limiter means comprising a portion of said second hub having a generally polygonal periphery and positioned within said hollow tube, whereby said polygonal periphery is spaced from the interior of said hollow tube in permitted angles of rotary motion, and a plurality of spaced sides of said polygonal periphery enter into engagement with the inner surface of said hollow tube at a plurality of contact areas spaced about the axis of said second hub at said desired limit of rotary motion and in which said second hub also carries a transversely extending arm, said second hub, including said limiter means and said arm, being made of a single, integral piece, said bearing means comprising a pair of generally semicircular bearing halves which are secured together about a portion of said second hub.

2. The suspension system of claim 1 in which said bearing halves are positioned within said hollow tube.

3. The suspension system of claim 2 which includes an alignment rod extending between said first and second hubs in coaxial relation therewith.

4. The suspension system of claim 3 in which said second hub, including said limiter means and said arm, is made of a single, cast piece.

5. The suspension system of claim 2 which includes an alignment rod extending between said first and second hubs in coaxial relation therewith.

6. The suspension system of claim 2 in which said arm carries a wheel at a position spaced from the junction of said arm and the rest of said second hub.

7. The suspension system of claim 2 in which said rotary motion limiter means comprises a peripheral portion of said second hub which is proportioned to be spaced from said stationary, hollow tube in permitted rotational positions of said suspension unit, but which is proportioned to engage said hollow tube to prevent further rotation of said second hub in at least one limiting rotational position, to prevent rotation to other, nonpermitted rotational positions.

8. In a suspension system which comprises a first hub, bearing means spaced from said hub, a second hub carried within said bearing means and rotatable relative to it, and a plurality of separate torsion bars positioned eccentrically relative to said first and second hubs and extending therebetween, at least a portion of said second hub being positioned within a stationary, hollow tube of non-circular cross section, said second hub defining rotary motion limiter means positioned within said hollow tube that moves into contact with inner surfaces of said hollow tube at a desired limit of rotary motion of the second hub, to prevent further rotary motion beyond said limit, in which said second hub also carries a transversely extending arm, and a bearing section of relatively reduced diameter, said bearing means comprising a pair of generally semi-circular bearing halves secured together about said bearing section of the second hub, said second hub, including said limiter means and said arm, being made of a single, integral piece.

9. The suspension system of claim 8 in which said arm carries a wheel at a position spaced from the junction of said arm and the rest of said second hub.

* * * * *